United States Patent
Schebaum et al.

(10) Patent No.: US 9,242,580 B2
(45) Date of Patent: Jan. 26, 2016

(54) VEHICLE SEAT MEMORY TRACK ASSEMBLY WITH MEMORY ADJUSTMENT COMPENSATION

(75) Inventors: Andre Schebaum, Steinhagen (DE); Michael Wojatzki, Ennigerloh (DE); Christian Ruthmann, Rietberg (DE); Hans-Peter Mischer, Bad Meinberg (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/355,973

(22) PCT Filed: Mar. 30, 2012

(86) PCT No.: PCT/US2012/031448
§ 371 (c)(1),
(2), (4) Date: May 2, 2014

(87) PCT Pub. No.: WO2013/147846
PCT Pub. Date: Oct. 3, 2013

(65) Prior Publication Data
US 2014/0239689 A1      Aug. 28, 2014

(51) Int. Cl.
*B60N 2/02*      (2006.01)
*B60N 2/07*      (2006.01)
(Continued)

(52) U.S. Cl.
CPC ............... *B60N 2/0722* (2013.01); *B60N 2/06* (2013.01); *B60N 2/08* (2013.01); *B60N 2/0818* (2013.01); *B60N 2/0843* (2013.01); *B60N 2/123* (2013.01); *B60N 2/20* (2013.01)

(58) Field of Classification Search
CPC ............ B60N 2/12; B60N 2/123; B60N 2/20; B60N 2/06; B60N 2/0722; B60N 2/0843; B60N 2/08; B60N 2/0818
See application file for complete search history.

(56) References Cited

U.S. PATENT DOCUMENTS

| 3,105,669 A | 10/1963 | Pickles |
| 4,844,542 A | 7/1989 | Humer |

(Continued)

FOREIGN PATENT DOCUMENTS

| CN | 101224715 A | 7/2008 |
| CN | 102371915 A | 3/2012 |

(Continued)

OTHER PUBLICATIONS

PCT Preliminary Report on Patentability and Written Opinion, issued Oct. 1, 2014, Applicant Lear Corporation, Application No. PCT/US2012/031448.

(Continued)

*Primary Examiner* — Philip Gabler
(74) *Attorney, Agent, or Firm* — Brooks Kushman P.C.

(57) ABSTRACT

The disclosed system employs vehicle seat track assembly including an easy entry system for a vehicle seat, further including a memory system having an adjustment increment compensator which allows for memory system which records displacement by an incremental distance, y, to be employed in a vehicle seat which employees a seat track that allows for fore-aft adjustment by a second incremental distance, x, thereby allowing seat designers and manufacturers to employ a single easy entry memory system on multiple vehicle seat track designs, each of which may have seat tracks which allow fore-aft adjustment at different increments, without modifying the easy entry memory system for each variation in fore-aft adjustment increment. The disclosed compensator also insures that the memory system will be activated even when there is a slight misalignment of the memory module components at the time of activation.

20 Claims, 11 Drawing Sheets

(51) Int. Cl.
*B60N 2/08* (2006.01)
*B60N 2/12* (2006.01)
*B60N 2/06* (2006.01)
*B60N 2/20* (2006.01)

(56) References Cited

U.S. PATENT DOCUMENTS

| | | | |
|---|---|---|---|
| 4,881,774 | A | 11/1989 | Bradley |
| 5,944,383 | A | 8/1999 | Mathey et al. |
| 6,647,814 | B2 | 11/2003 | Christopher |
| 6,767,063 | B1 | 7/2004 | Abdella et al. |
| 8,517,328 | B2 | 8/2013 | Wieclawski et al. |
| 2009/0200849 | A1* | 8/2009 | Schmale ................ 297/341 |
| 2011/0012004 | A1* | 1/2011 | Wieclawski et al. ......... 248/429 |
| 2011/0169294 | A1* | 7/2011 | Sandmann et al. ........ 296/65.15 |
| 2013/0334390 | A1 | 12/2013 | Schebaum et al. |

FOREIGN PATENT DOCUMENTS

| | | |
|---|---|---|
| DE | 19918600 A1 | 11/1999 |
| DE | 10342001 A1 | 3/2005 |
| DE | 102009033892 A1 | 2/2011 |
| DE | 102011002656 A1 | 9/2011 |
| DE | 102010039395 A1 | 2/2012 |
| GB | 2298785 A | 9/1996 |
| WO | 03062012 A1 | 7/2003 |
| WO | 2007094011 A2 | 8/2007 |
| WO | 2010080593 A1 | 7/2010 |
| WO | 2010080597 A1 | 7/2010 |

OTHER PUBLICATIONS

International Search Report and Written Opinion, International Application No. PCT/US12/31448, mail date Jun. 27, 2012.

Office Action from corresponding Chinese patent application No. 201280066637.X, dated Sep. 14, 2015.

Extended European Search Report from corresponding European Application No. 12872973.8, (Nov. 13, 2015) 7 pp.

* cited by examiner

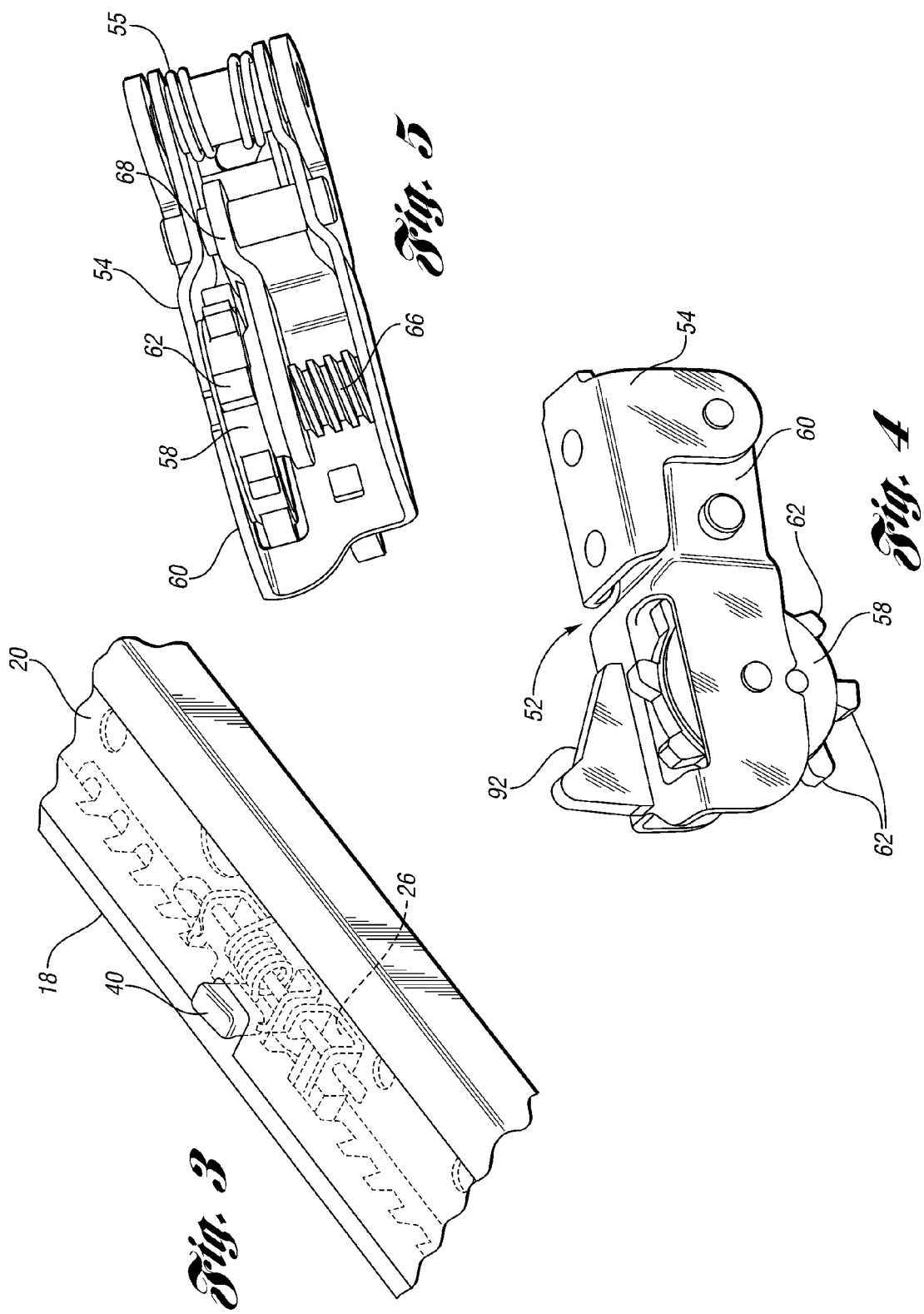

VEHICLE SEAT MEMORY TRACK ASSEMBLY WITH MEMORY ADJUSTMENT COMPENSATION

CROSS-REFERENCE TO RELATED APPLICATION

This application is the U.S. national phase of PCT Application No. PCT/US2012/031448 filed on Mar. 30, 2012, published as WO 2013/147846, the disclosure of which is incorporated in its entirety by reference herein.

BACKGROUND

Vehicles such as passenger cars typically include seats for the use of the driver and other occupants. In many vehicles, the position of the seats may be adjusted for the comfort of the occupants. Adjustment options, particularly for the first row of seats, typically include the capability to move the seat in fore and aft directions by operation of a track assembly which mounts the seat to the vehicle floor. These existing systems typically employ a comfort adjustment bar which is operatively connected to the seat track locking system to release the track locking system to unlock the seat from the lower track when the bar is operated by the occupant, thereby allowing the occupant to slidably position the seat along the length of the tracks as desired. The seat track fore-aft adjustment system may be designed to incrementally adjust the seat forward and rearward by any desired increment. One such adjustable seat track assembly is disclosed in PCT Publication No. WO 2010/080597 A1.

Some vehicle seats, particularly first row seats, may include the capability of folding the seatback forward then sliding the entire seat forward to facilitate access to the second row of seats. This is known as an "easy entry" option, and is commonly seen in two-door vehicles. The easy entry option allows the generally upright back portion of the seat to be dumped, or pivoted, forward from its normal position, at the same time unlocking the seat to allow the seat to be slidably positioned forward in the passenger compartment to provide more spaced behind the seat to gain entrance into the second row of seats.

Seats which include an easy entry capability may also include a memory system, typically disposed in one of the pair of seat tracks and configured to remember a longitudinal position of the corresponding upper track with respect to the corresponding lower track such that, whenever the seatback is dumped forward and the seat slid forward for easy entry to the second row, and the seat is thereafter slidably positioned rearward for use by the front row occupant, the sliding seat automatically stops at the previously selected use position. Vehicle seats including easy entry capabilities with position memory systems are disclosed in PCT Publication No. WO 2010/080593 A1.

In memory systems of the type disclosed in PCT Publication No. WO 2010/080593 A1, a separate set of notches in one of the pairs of upper or lower tracks are often employed and accessed by a memory wheel to "record" the amount of seat travel to accomplish the above-described memory function.

SUMMARY

The disclosed system employs an easy entry memory system for a vehicle seat which employees a seat track that allows for fore-aft adjustment by a first incremental distance, x. The memory system includes an adjustment increment compensator which allows for the memory system, which records seat fore-aft displacement by a second incremental distance, y, to be employed in the vehicle seat, thereby allowing seat designers and manufacturers to employ a single easy entry memory system on multiple vehicle seat designs, each of which may have seat tracks which allow fore-aft adjustment at different increments, without modifying the easy entry memory system for each variation in fore-aft adjustment increment. The disclosed compensator also insures that the memory system will be activated even when there is a slight misalignment of the memory module components at the time of activation.

The disclosed system includes a vehicle seat memory track assembly including two pairs of upper and lower seat rails that are positioned on opposite sides of a seat bottom of a vehicle seat. Each lower rail is fixedly attachable to a vehicle support structure, such as a vehicle floor, and each upper rail is fixedly attachable to the seat bottom and slidably mounted in a respective lower seat rail. The disclosed system further includes a seat track locking system including two track locking assemblies, each one disposed in one of the pairs of tracks, and each track locking assembly being configured to lock a respective upper rail in a variety of longitudinal positions with respect to its corresponding lower rail, wherein the longitudinal positions are spaced apart be a first predetermined adjustment increment, such as, for example, five millimeters. A first actuator is operably connected to the seat track locking system. The first actuator includes a release lever positioned to be moved by an occupant from a non-activated position to an activated position, whereby the activation bracket disengages the seat track locking system to allow slidable longitudinal movement of the seat to a different desired seating position.

The disclosed system also includes a second actuator for activating the memory system under certain pre-defined conditions, such as when the seatback is folded forward and the seat is slidably positioned forward to allow an occupant to gain entry to the second row of seats. The memory system is mounted on one of the upper rails and is engageable with the corresponding lower rail whenever the memory system is activated. When activated, the memory system records the longitudinal travel of the seat in a second predetermined adjustment increment, such as, for example, 10 millimeters, so that after entry to the second row is gained and the operator slides the seat rearward along the lower rails, the memory system stops the seat at approximately the same use position that the seat was in prior to folding and moving the seat for easy entry.

In the disclosed system, however, the first adjustment increment of the seat track is smaller than the second adjustment increment recordable by the memory system. The second actuator therefore includes a compensator which activates the memory system even in the event the condition for activation is delayed until such time as the track has been slidably positioned to a position that can be tracked by the memory system to a distance that is a whole number multiple of the second adjustment increment. The compensator of the disclosed system is also effective to insure that the memory system is activated even when there is a slight misalignment of the memory module components at the time of desired activation of the memory system.

In one disclosed embodiment, the compensator includes an activation disc which is rotated to urge an activation sled to, in turn activate the memory module. In the event that the module cannot engage (because it records at a different increment than the positional increment of the seat track, or because it is misaligned), the disc rotates relative to the sled and provides a stored activation force upon the sled, resulting in delayed activation of the memory module as the seat is further slidably positioned.

In a second disclosed embodiment, the compensator includes an outer sled and an inner sled, each of which are slidably positioned by an activation lever to urge the inner sled to, in turn, activate the memory module. In the event that the module cannot engage (because it records at a different increment than the positional increment of the seat track, or because it is misaligned), the outer sled moves linearly relative to the inner sled and provides a stored activation force upon the inner sled, resulting in delayed movement of the inner sled and activation of the memory module as the seat is further slidably positioned.

BRIEF DESCRIPTION OF THE DRAWINGS

FIG. 3 is a partial perspective view of a portion of the seat track assembly of FIG. 2, showing the track lock activation member;

FIG. 4 is a perspective view of the disclosed memory module;

FIG. 5 is a lower view (when installed) of the memory module;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the teachings of the present invention.

Figure 1:
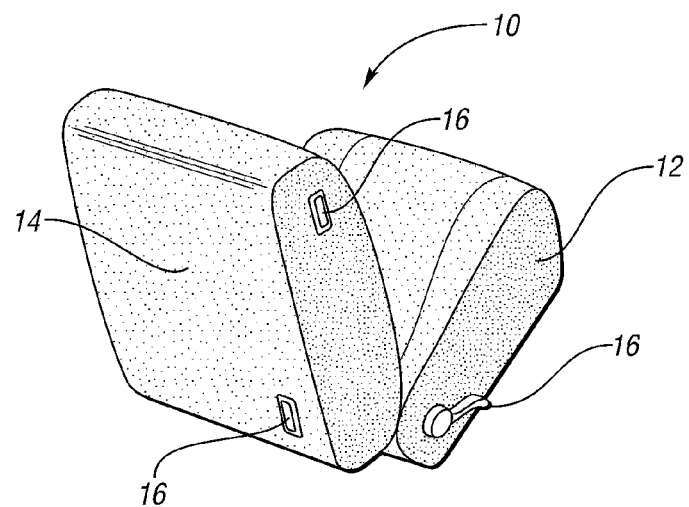
FIG. 1 is a rear perspective view of a bucket seat.

Referring to FIG. 1, the disclosed vehicle seat memory track assembly may be used with a vehicle seat, such as bucket seat 10, or other similar type seat commonly installed as the front row of seats in a vehicle. The bucket seat 10 includes a seat portion 12 and a backrest 14. Each of the seat portion 12 and the backrest 14 may be cushioned and upholstered with a suitable fabric, vinyl, or leather cover for aesthetics and the comfort of the seat occupants. The backrest 14 may be attached for pivotal rotation relative to the seat portion 12 to provide a variety of inclination positions for the seated occupant. The backrest 14 may also be rotatable between an inclined, use position and a collapsed (or dumped) position, folded forward over the seat portion 12 to provide more space within the vehicle for ingress, egress, or stowage. The pivotal movement of the backrest 14 relative to the seat portion 12 may be accomplished by actuating one of one or more handles 16 which are operably connected to a backrest adjustment mechanism (not shown) to adjust the inclination of, and/or dump, the backrest 14.

Figure 2:
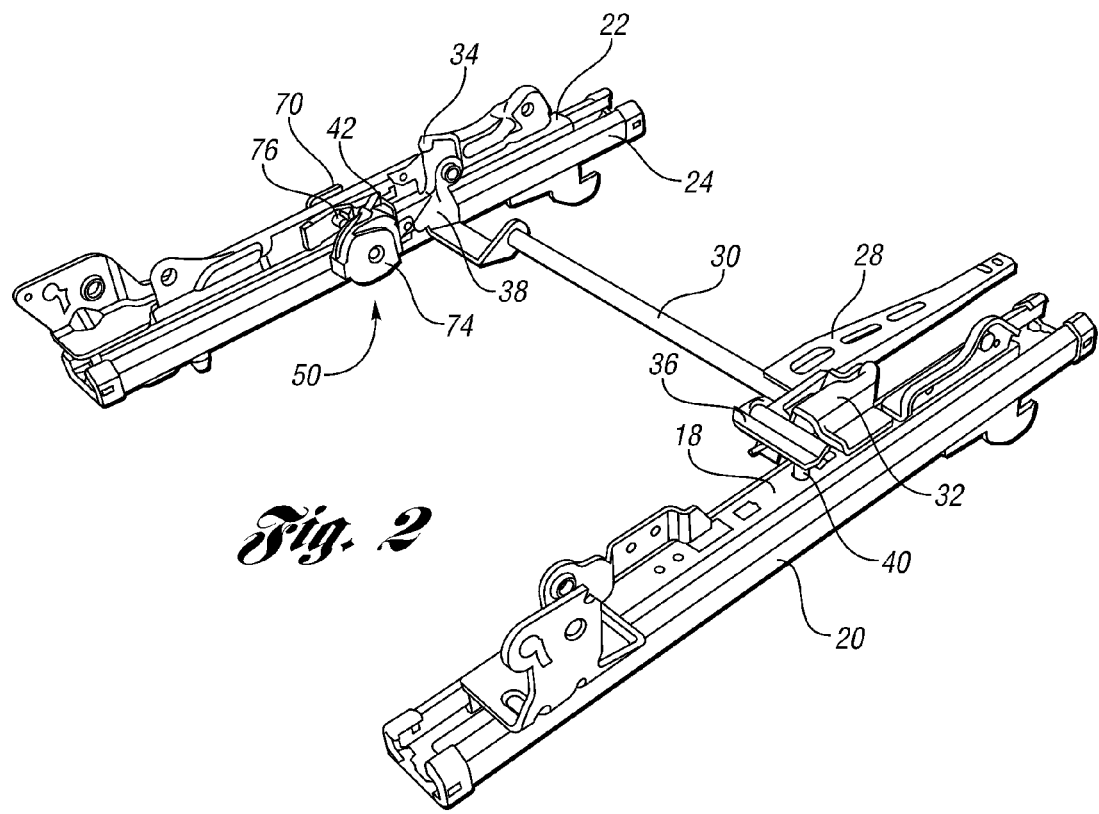
FIG. 2 is a rear perspective view of one embodiment of the disclosed vehicle seat memory track assembly.

Referring now to FIGS. 1 and 2, the seat track memory system may include at least one pair of upper and lower rails. In the illustrated embodiment, the seat track memory system includes two pairs of upper and lower rails, 18, 20 and 22, 24, arranged in a spaced-apart, generally parallel configuration on opposite sides of the seat bottom 12. Each lower rail 20, 24 is fixedly attached to a vehicle support structure, such as a vehicle floor. Each upper rail 18, 22 is fixedly attached to the seat bottom 12 and slidably mounted in a respective lower seat rail 20, 24 for movement of the upper rails 18 and 22 and, thus, the seat, relative to the floor of the vehicle.

Referring now to FIGS. 2 and 3, the disclosed system includes a seat track locking system including at least one locking assembly 26 (shown in FIG. 3) connected to one of the pair of upper and lower rails and operable to lock the upper rail 18 from movement with respect to the lower rail 20 when the locking assembly 26 is engaged. The disclosed system employs a pair of locking assemblies (each as shown as 26 in FIG. 3), one each mounted, respectively, on upper rails 18 and 22. Each locking assembly 26 is operable to move from a disengaged condition during which each of the upper rails 18, 22 may be slidably positioned within lower rails 20, 24, and an engaged position during which each of the upper rails 18, 22 is locked in one of a plurality of selectable longitudinal locations with respect to lower rails 20, 24. Further details relating to the structure and operation of similar seat track locking systems are disclosed in PCT Publication No. WO 2010/080597 A1, the disclosure of which is hereby incorporated herein by reference. In one embodiment, the longitudinal positioning locations are spaced five millimeters (5 mm) apart from each other.

A first actuator is operably connected to the seat track locking system, and is movable between a non-activated position and an activated position whereby the seat track locking system is disengaged to allow slidable longitudinal (i.e., fore-aft) movement of the seat. In the disclosed system, the first actuator includes a release lever 28, which may include a handle or other handgrip (not shown) attached at the outboard end (i.e., the end nearest the forward edge of the seat bottom 12). The release lever 28 is attached at its inboard end to a crossbar (or tube) 30 that is rotatably connected at each end, respectively, to support brackets 32, 34, which support brackets 32, 34 are fixedly secured (such as, for example, by welding) to their corresponding upper rails 18, 22. The release lever 28 is fixedly connected to the crossbar 30 such that upward lifting of the lever handle 28 rotates crossbar 30. In an alternative embodiment, the release lever 28 can be configured as a conventional towel bar-type actuator mounted to extend within the upper and lower rail pars, as shown in PCT Publication No. WO 2010/080597 A1.

In the illustrated embodiment, as shown in FIG. 2, the first actuator also includes an activation bracket 36, 38 associated with each pair of upper and lower rails. Each activation bracket 36, 38 is fixedly mounted on the end of the crossbar 30 adjacent and exterior to its associated pair of upper and lower rails for rotation from a first position (shown, for example, in FIGS. 2 and 7) to a second position (as shown, for example, in FIGS. 11-14), at which second position each activation bracket 36, 38 presses an activation button, 40, 42 which is connected to each track locking assembly 26 associated with each pair of upper and lower rails, and which, when depressed, causes each track locking assembly 26 to disengage, allowing rails 18, 22 to be slidably positioned with respect to rails 20, 24.

Referring now to FIG. 2, the disclosed system includes a memory system, generally indicated as 50, mounted on one of the pairs of upper and lower rails 22, 24 which, when engaged, disengages the seat track locking system, and records the last user-selected seating position of the vehicle seat to allow for forward movement of the seat from the user selected location to a more forward location (such as, for example, when the backrest 14 is dumped to allow ingress or egress to or from, respectively, a rearward seat), and thereafter return the seat rearward up to, but not past, the recorded user-selected location.

Figure 10:
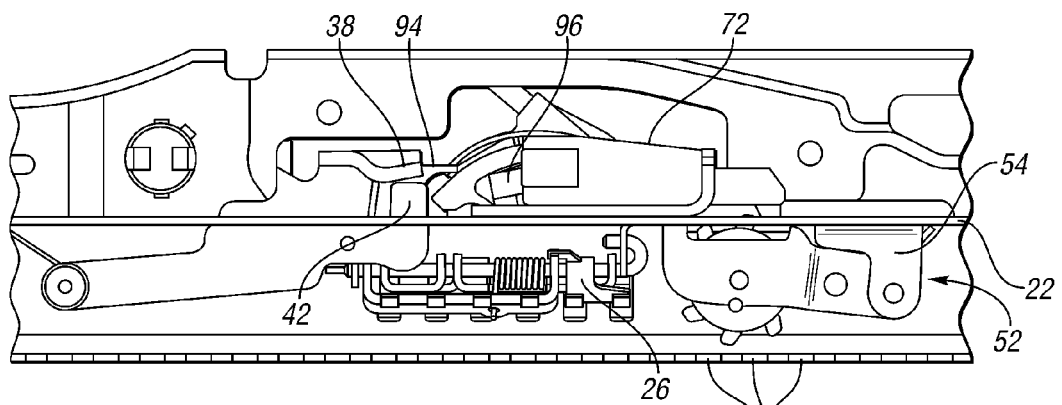
FIG. 10 is a side elevational view, in partial cross-section, of the track assembly (on the memory side, but from the opposite side of the track shown in FIG. 9) showing the memory module in the non-activated position.

Referring now to FIG. 10, the memory system 50 includes a memory module 52 disposed in one of the pairs of tracks 22, 24. When activated, the memory module 52 is configured to record the travel of the upper track 22 with respect to the lower track 24, thereby remembering a longitudinal position of the corresponding upper track with respect to the lower track. The memory module 52 is pivotally connected to a pivot bracket 54, which is fixed to the first upper track 22. The memory module 52 is pivotable from a raised, non-activated position (shown in FIG. 10) to either (1) a fully lowered, activated position (shown in FIG. 14), or (2) to a partially lowered, intermediate position (shown in FIG. 12).

Figure 6:
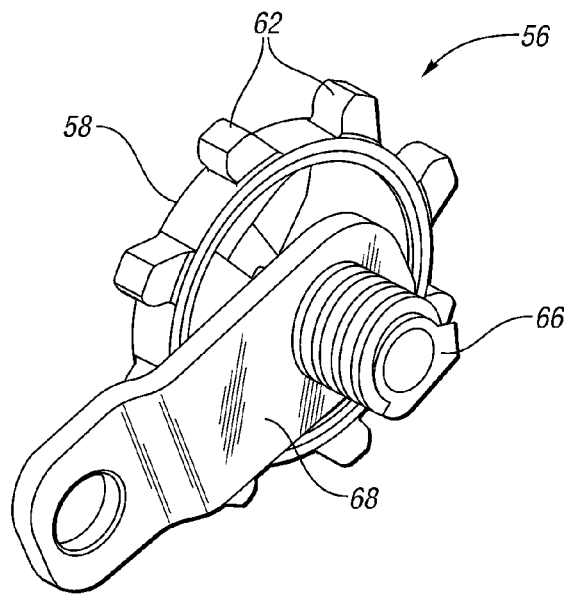
FIG. 6 is an isolated view of the memory module gear wheel, end stop, spindle, and memory nut.

Referring now to FIGS. 4-6, the memory module 52 includes a track wheel assembly 56 including a track gear wheel 58 rotatably mounted on a wheel support bracket 60. The wheel support bracket 60 is pivotally mounted on the pivot bracket 54, which in turn is mounted on the upper track 22. The track gear wheel 58 is rotatably engageable with the first lower track 24 (see FIG. 14) when the memory module 52 is moved to the fully activated position. The track gear wheel 58 includes a plurality of gear teeth 62 that are configured to extend into notches 64 formed in the first lower track 24 as the track gear wheel 58 moves with respect to the first lower track 24. The track gear wheel 58 is also connected to a threaded spindle 66 that receives a threaded memory nut 68. The memory nut 68 has an end stop (not shown) that engages an end stop of the track gear wheel 58 when the memory module is in the memorized position (for example, when the seat has been again moved rearward to its selected use position after the backrest has been dumped and the seat moved forward for ingress or egress to or from the second row seats). The memory module 52 may also include a clock spring (not shown) having one end engaged with the track gear wheel 58 and an opposite end engaged with a plastic disc that is fixed with respect to the wheel support bracket 60 on which the track gear wheel 58 is mounted, such that the clock spring urges the track gear wheel 58 toward an initial position into engagement with the memory nut 68. The memory module 52 may also include a spring 55 that biases the memory module 52 toward the raised, non-activated position.

Figure 12:
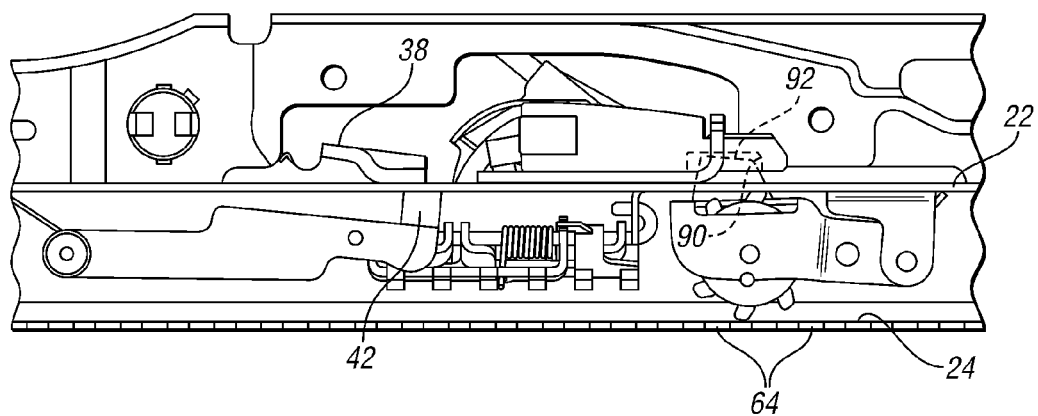
FIG. 12 is a side elevational view, in partial cross-section, of the track assembly (on the memory side, but from the opposite side of the track shown in FIG. 11) showing the memory module in the intermediate position.

If a particular gear tooth 62 is not aligned with the respective notch 64 in the first lower track when the memory module 52 is urged downward toward the fully activated position, the memory module 52 will be temporarily held in an intermediate position, as shown in FIG. 12 and further described herein. In one embodiment, the notches 64 are spaced ten millimeters (10 mm) apart from each other, allowing the module to "remember" and restore the seat to within ten millimeters (10 mm) of its original position.

Figure 7:
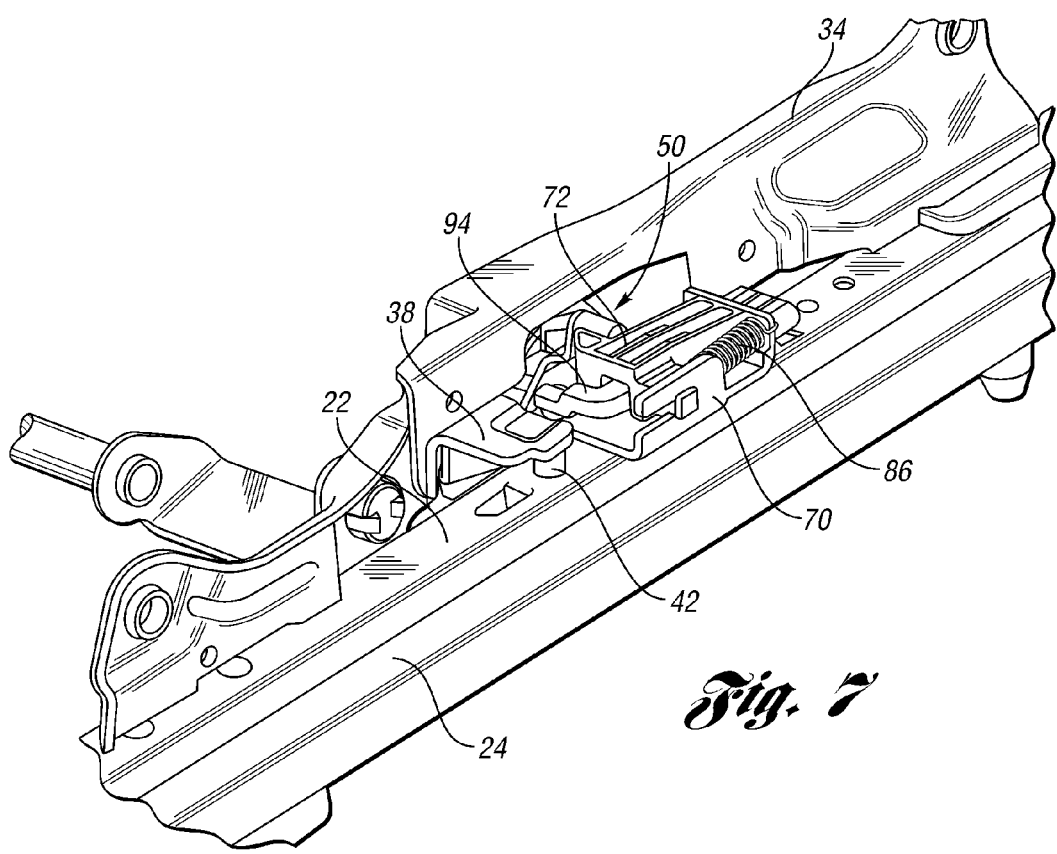
FIG. 7 is a side forward elevational view of the track assembly (on the memory system side) from the opposite side of the track shown in FIG. 2.
Figure 8:
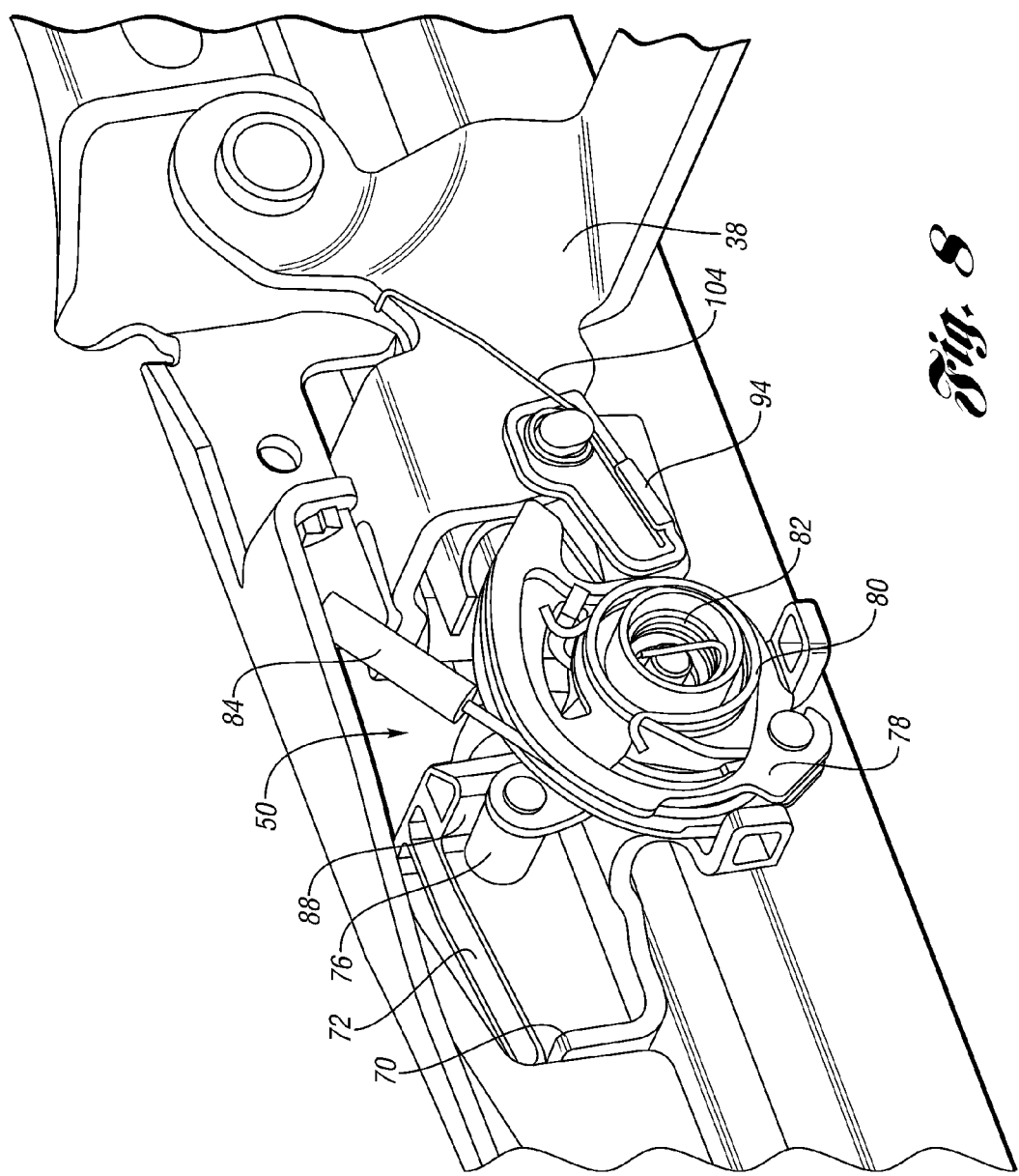
FIG. 8 is a partial rearward side perspective view of portion of the track assembly shown in FIG. 7 (on the memory side) including the memory system in the non-activated condition with the cover removed from the activation disc.

Referring now to FIGS. 7 and 8, the disclosed memory system 50 also includes an additional support bracket 70 fixed to the upper track 18, and a sled 72, mounted for slidable movement on additional support bracket 70 which support bracket 70 is fixedly secured to upper rail 22, either directly, or indirectly by securing bracket 70 to bracket 34.

Memory system 50 also includes a second actuator including a compensator 74, an activation lever 76, and a Bowden cable 84. In the embodiment illustrated in FIGS. 2-18, and with reference particularly to FIG. 8, the compensator 74 includes an activation disc 78 which, along with the activation lever 76, is pivotally mounted on the additional support bracket 70. A spring 80 is disposed between the activation disc 78 and the activation lever 76 for biasing the activation lever 76 forwardly (i.e., in the clockwise direction as shown in FIG. 8) with respect to the activation disc 78. A pre-tensioning spring 82 is also disposed between the additional support bracket and the activation disc 78 for biasing the activation disc 78 rearward (i.e., in the counter-clockwise direction as shown in FIG. 8) to pretension the Bowden cable 84 connected to the activation disc 78 and the seatback 14.

The activation lever 76 extends across a portion of the top surface of the upper rail 22 and the sled 72. The sled 72 is biased rearwardly, toward a non-activated position, by a sled spring 86, when the memory system 50 is deactivated. The Bowden cable 84 connects the activation disc 78 to the backrest 14 such that, when the backrest 14 is dumped forward, the Bowden cable 84 is refracted, thereby rotating the activation disc 78 forwardly (i.e., in the clockwise direction as shown in FIG. 8), which, in turn compresses spring 80, thereby applying a forward rotational (i.e., in the clockwise direction as shown in FIG. 8) force upon activation lever 76. As illustrated in FIGS. 9-14, when actuated by the refracting Bowden cable 84 and the rotating activation disc 78, activation lever 76 moves into contact with the facing surface 88 of the sled 72, thereby urging the sled in a forward direction. A cam surface 90 located on the underside of sled 72, contacts a tab 92 on the wheel support bracket 60 as the sled is moved forward, thereby urging the memory module 52 downward into its activated position.

It should be noted that, although the disclosed embodiment of FIGS. 2-18 employs the Bowden cable 84 and sled 72 in an orientation in which the cable retracts, and the sled moves, in a forward direction to activate the memory system 50, it is contemplated that the disclosed orientation of these components may be altered or reversed to facilitate these motions in the rearward direction to activate the memory system 50, such as, for example, in the second disclosed embodiment of FIGS. 19-25. Also, components which are described in this disclosure as moving "downward" or "upward" in their operation, may alternatively be oriented such that they perform the described functions through motions in the direction opposite from the directions disclosed in the specific embodiments described herein.

Referring to FIGS. 9-14, when the seatback 14 is dumped forward and the Bowden cable 84 rotates activation disc 78, and thereby the activation lever 76 to urge sled 72 towards the memory activation position, the activation disc 78 also moves the reset activation lever 94 downwardly with respect to the activation bracket 38 until the reset activation lever 94 engages a stop on the activation bracket 38. The activation disc 78 then moves the reset activation lever 94 together with the activation bracket 38 downwardly, thereby depressing seat lock release button 42, thereby releasing the seat track lock system. Thus, when the seatback 14 is dumped forward the rotation of activation disc 78 simultaneously urges the sled 72 of the memory system towards its activated position, while causing disengagement of the seat track locking system 26, thereby allowing for slidable movement of the dumped seat.

As further described herein, the disclosed compensator mechanism 74 allows the memory module 52 to function when mounted in a seat track system wherein the fore-aft seat adjustment increments are less than memory module increments (such as, for example, the five millimeter fore-aft adjustment increment and ten millimeter memory module increment of the disclosed embodiment), or when there is a slight misalignment between the locking system and the memory module. It will thus be appreciated that this disclosed memory system 50 allows for production of a single, standard memory system (such as, for example, the disclosed ten millimeter increment memory system), and implementation of that memory system with seat track systems having varying fore-aft increments (such as, for example, the five millimeter seat track system disclosed herein) in addition to matching the memory system with a ten millimeter seat track system.

Figure 11:
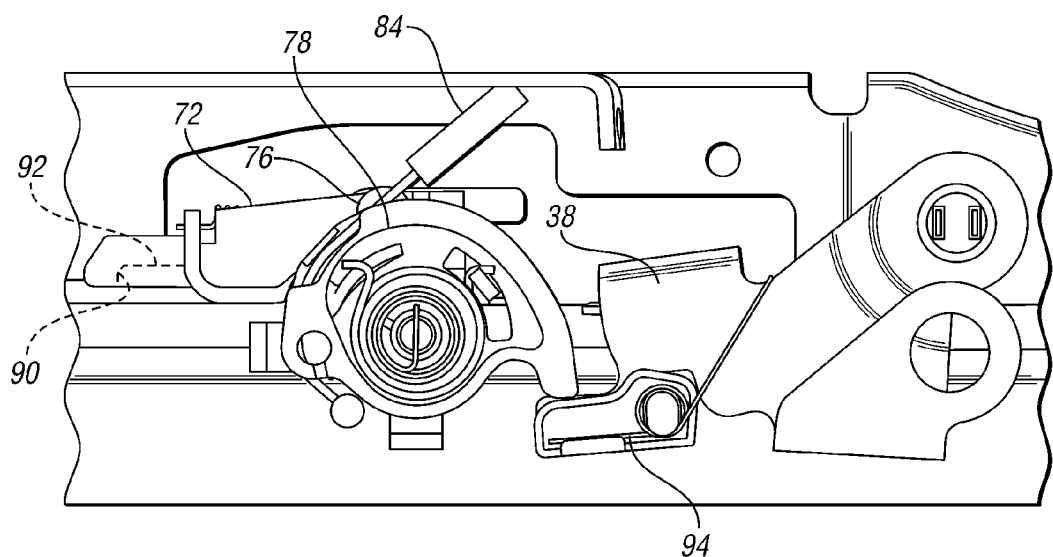
FIG. 11 is a partial side elevational view of a portion of the track assembly (on the memory side) including the memory system in the activated, but intermediate condition with the cover removed from the activation disc.
Figure 13:
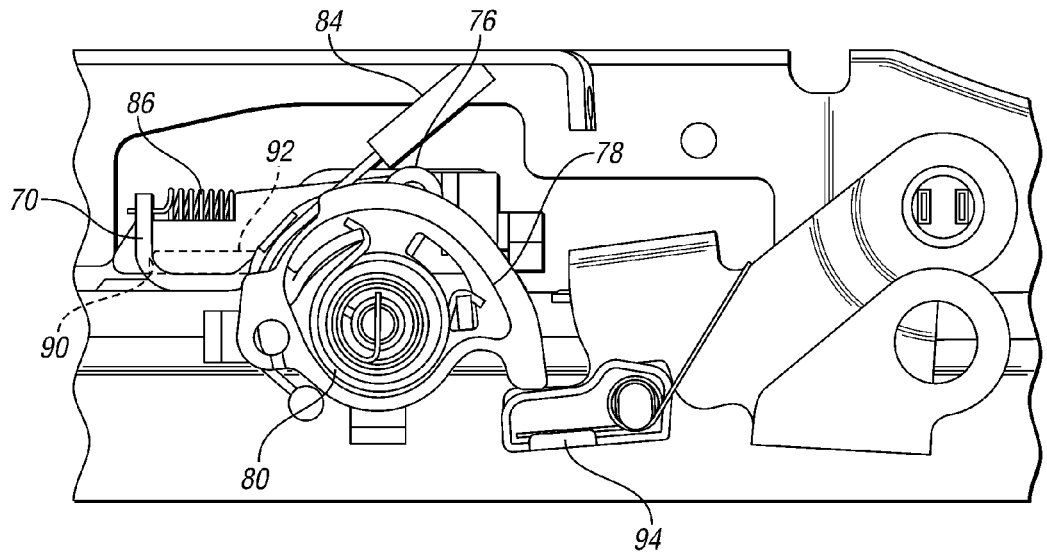
FIG. 13 is a partial side elevational view of a portion of the track assembly (on the memory side) including the memory system in the activated condition with the cover removed from the activation disc.
Figure 14:
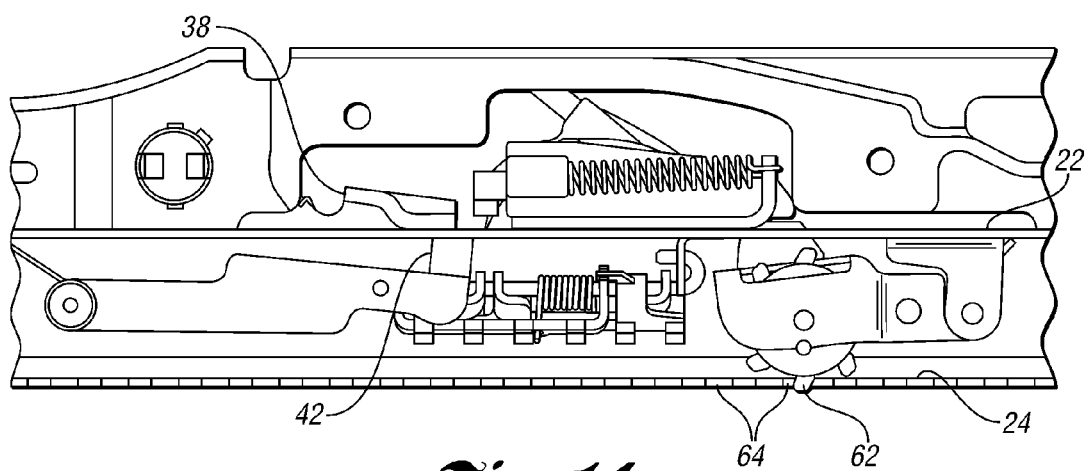
FIG. 14 is a side elevational view, in partial cross-section, of the track assembly (on the memory side, but from the opposite side of the track shown in FIG. 13) showing the memory module in the activated position.

Under normal non-memory operation (i.e., when the memory module 52 is de-activated) the track gear wheel 58 is disengaged from the first lower track 24, and the position of the first upper track 22a may be fixed with respect to the first lower track 24 by the track locking system. When the memory module 52 is activated by pivoting the seat back 14 of the vehicle seat forward, each of the track locking assemblies 26 are move from a locked (or engaged) position to a released (or disengaged) position. At the same time, the memory module 52 is urged downward into the activated position as shown in FIGS. 13 and 14, or to an intermediate, biased-downward-but-not-yet-engaging position as shown in FIGS. 11 and 12, in the event the lowermost tooth 62 of the wheel is not aligned with a notch 64 in the lower track due to misalignment or different four-aft positioner and memory module incremental distances as described above.

Figure 15:
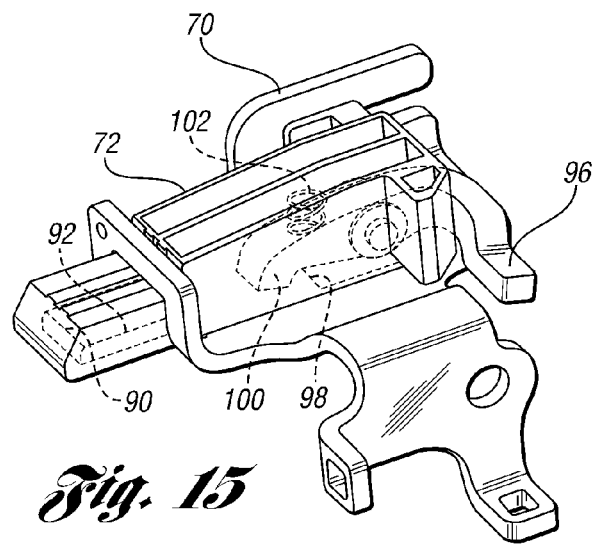
FIG. 15 is a rearward perspective, partial phantom view of the additional support bracket, the sled, and the reset lever with the reset lever in the disengaged position.
Figure 16:
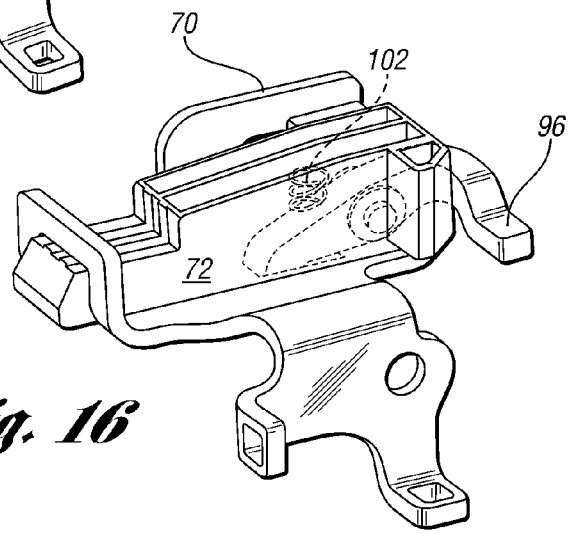
FIG. 16 is a rearward perspective, partial phantom view of the additional support bracket, the sled, and the reset lever with the reset lever in the engaged position.
Figure 17:
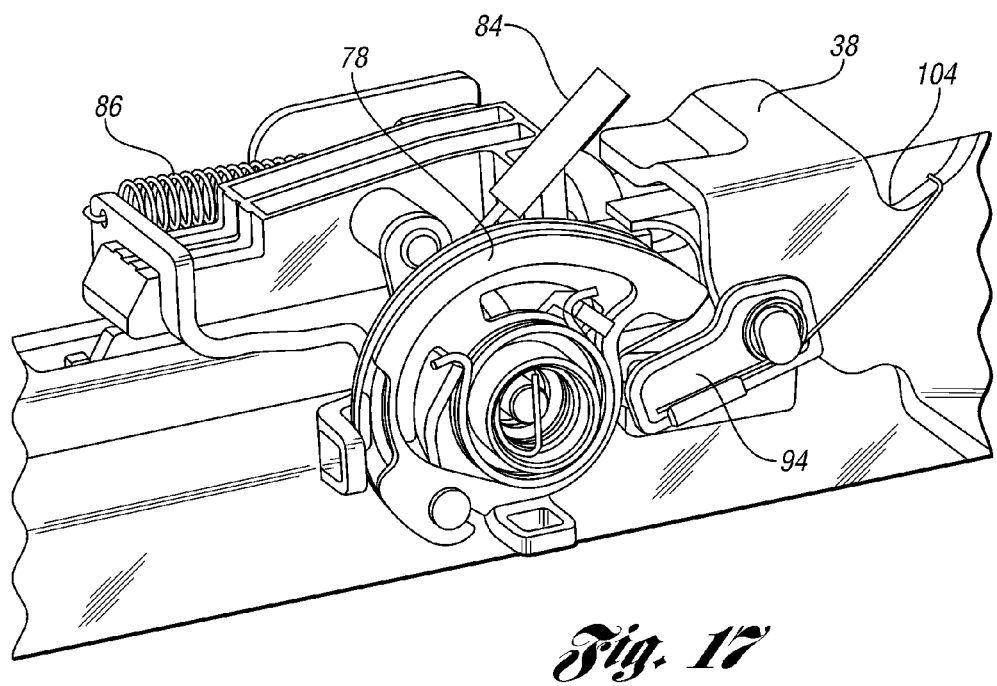
FIG. 17 is a partial rearward side perspective view of a portion of the track assembly shown in FIG. 7 (on the memory side) including the memory system with the cover removed from the activation disc, as the backrest is raised from a dumped forward to a use position.
Figure 18:
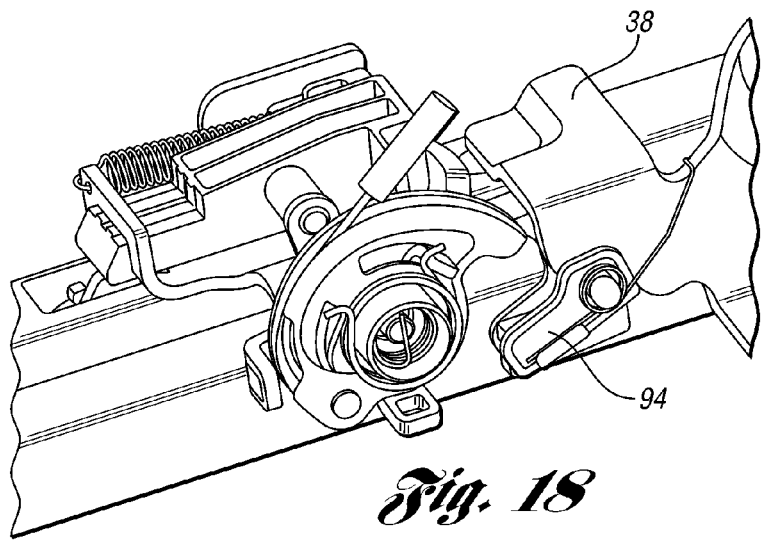
FIG. 18 is a partial rearward side perspective view of portion of the track assembly shown in FIG. 7 (on the memory side) including the memory system with the cover removed from the activation disc and with the activation disc rotated to the non-activated condition.

Referring now to FIGS. 15-18, in the disclosed system of FIGS. 1-18, the memory module activation system includes a reset lever 96, which is movably mounted on the sled 72 and engageable with the additional support bracket 70. As shown in FIGS. 15 and 18, when the sled 72 is in the de-activated position (i.e., when it is biased rearward by the spring member 86), the rearward end 100 (the end inboard of the sled) of the reset lever 96 is retained in a raised, non-interference position with respect to a cutout 98 in the additional support bracket 70. As will be explained in further detail below, when the sled is moved into the activated position (i.e., when it is forced forward by the activation lever 76 as the activation lever 76 is pivoted forward due to the rotation of the activation disc 78 due to retraction of the Bowden cable), the rearward end 100 of reset lever 96 is urged downward by the resilient spring element 102 into a cutout 98 on the additional support bracket 70, thereby locking the sled in the forward, activated position shown in FIGS. 16 and 17. Thus, once locked, the reset lever 96 remains biased downwardly in the locked position by spring 102.

Figure 9:
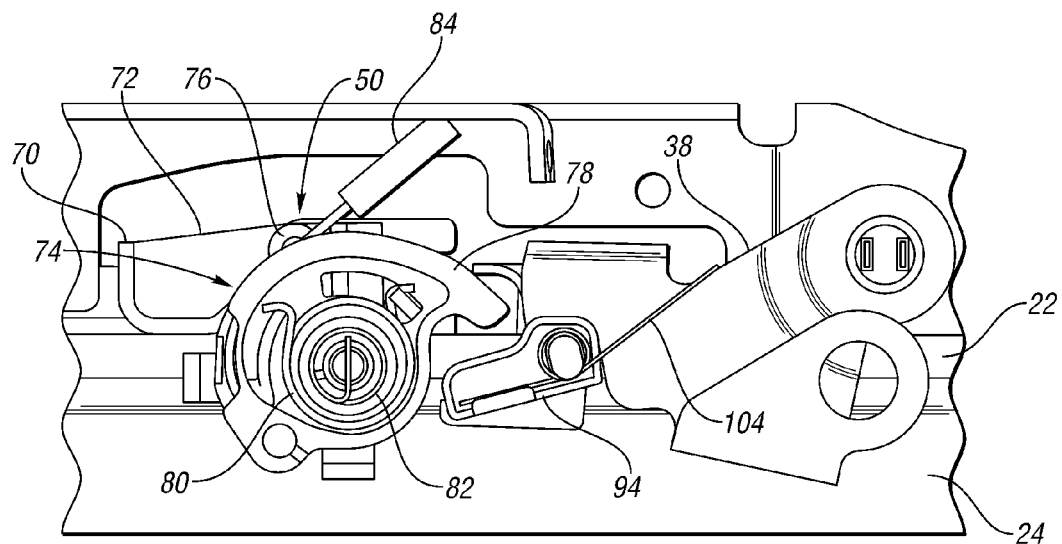
FIG. 9 is a partial side elevational view of a portion of the track assembly (on the memory side) including the memory system in the non-activated condition with the cover removed from the activation disc.

Referring to FIGS. 9 and 10, as previously described, the reset activation lever 94 is pivotally mounted on the activation bracket and is configured to actuate the reset lever 96 and thereby move the reset lever from the locked position to the unlocked position, as explained below in detail. The reset activation lever 94 is biased upwardly, toward a non-activated position by a bias spring 104 that extends between the activation bracket 38 and the reset activation lever 94.

Operation of the memory system 50 will now be described in greater detail. FIGS. 9 and 10 show the memory system 50 in the deactivated condition, such as when the backrest is upright and the seat is locked in a preferred use position on the track assembly. The sled 72 is similarly biased by spring member 86 in the de-activated position, and the reset lever 96 in its raised, inactive position. In this normal use condition, memory module 52 is pivoted upward into its non-activated position by virtue of biasing spring 55, whereby track gear wheel 58 is disengaged from the lower track 24 (as shown in FIG. 10).

To activate the memory system 50, the seatback 14 is pivoted forwardly (or dumped) causing the Bowden cable which interconnects a location on the frame of the backrest to the activation disc to rotate the activation disc, causing the activation disc to rotate from the non-activated position (shown in FIGS. 8-10) to an activated position (shown in FIGS. 11-14). As a result, the activation lever 76 is urged forwardly toward its activated position by the activation disc 78 and compensator spring 50. The activation lever 76, in turn, engages the sled 72 and slides the sled forwardly along the additional support bracket 70 and against the bias of the sled spring 86 to its activated position. The sled in turn engages a projection 92 (shown in FIG. 4) formed on the memory module, and urges the memory module downward toward its activated position.

As mentioned above, if a respective gear tooth 62 on the gear wheel of the memory module is not aligned with a respective notch 64 in the first lower track when the memory module is moved towards its activated position, the memory module will be temporarily held in the intermediate positions shown in FIGS. 11 and 12. In such case, the activation lever 76 and sled 72 will not move fully forward to their respective activated positions. Instead, the compensator spring is configured to allow relative movement of the activation disc 78 with respect to activation lever 76, yet maintain sufficient spring force upon the lever 76 (and, therefore, the sled 72) such that the activation disc may move all away to its activated position while the activation lever 76, sled 72, and thus, the memory module 52 are each held in an intermediate position.

When the vehicle seat bottom (and upper tracks) are then moved forward slightly such that a respective gear tooth 62 on the gear wheel 58 becomes aligned with a notch 64 in the lower track, the memory module 52 will be able to pivot further downwardly to the activated position, due to urging by the activation lever 76 and sled 72, such that the track gear wheel engages into one or more notches in the first lower track, as shown in FIG. 14. Continued forward movement of the seat bottom and upper tracks will then cause the gear wheel to rotate along the first lower track, which causes the memory nut to move along the spindle and away from the gear wheel as previously described.

Referring to FIG. 13, as the activation disc 78 moves toward its activated position, the activation disc 78 also moves the reset activation lever 94 downwardly with respect to the activation bracket 38 until the reset activation lever engages a stop on the activation bracket. The activation disc then moves the reset activation lever together with the activation bracket downward. Because the reset activation lever 94 is moved first with respect to the activation bracket 38, the reset activation lever 94 does not engage the reset lever 96 when the reset activation lever and activation bracket are moved downwardly together. Furthermore, referring to FIG. 2, because the activation bracket 38 on the memory side is linked with the activation bracket 36 on the non-memory side, rotation of the activation bracket 38 on the memory side causes the activation bracket 36 on the non-memory side to rotate as well. As a result, each activation bracket engages a track locking system activation member 42 (shown in FIG. 14 for the memory side), and moves the activation member downwardly to unlock the corresponding seat track locking system.

FIGS. 13 and 14 illustrate the memory system 50 in the activated position. In this position, the rearward end of the reset lever 96 moves downward into the notch 98 in the additional support bracket 70 (as shown in FIG. 16) and engages the bracket such that the sled 72 is retained in its forward, activated position. When the vehicle seat bottom and upper tracks 18, 22 are then moved forward, the engaged track gear wheel 58 rotates along the first lower track 24, causing the memory nut 68 to move along the threaded spindle 66 away from the gear wheel 58. When the vehicle seat bottom and upper tracks 18, 22 are thereafter moved back toward the last selected use position, the memory nut 68 travels back on the threaded spindle 66 toward the gear wheel 58 until the associated end stops on the memory nut 68 and the gear wheel 58 engage each other, thereby preventing further rearward movement of the vehicle seat bottom and upper tracks 18, 22 with respect to the lower tracks 20, 24.

Referring now to FIG. 17, when the backrest 14 is raised to a use position, the Bowden cable 84 no longer pulls on the activation disc 78. As a result, the activation disc 78 rotates rearwardly (i.e., counter-clockwise in FIG. 17), disengaging from activation bracket 38, thereby allowing activation brackets 36, 38 to rotate forwardly (i.e., to their inactive positions) through urging by the associated springs, and each of the track locking assemblies 26 to return to the locked position. The reset lever 96, however, remains in the notch 98 in the additional support bracket 70 (as shown in FIG. 16) and engages the bracket such that the sled 72 is retained its forward, activated position, and, therefore, memory module 52 is also retained in the activated position. Thus, while raising the backrest 14 to its upright (use) position results in loosening the Bowden cable, rotation of the activation brackets 36, 38 to their inactive positions, release of buttons 40 and 42, and, thereby, re-engagement of the track locking assemblies 26 to lock the seat in position at whatever location the backrest is raised to a use position, the memory system remains activated. The memory system is reset only by pulling up on the external release lever 28 as described below.

It will be appreciated by those of skill in the art that this disclosed arrangement allows the user to dump the backrest, slide the seat forward, slide the seat back to a position short of the memorized (or originally set) use position, raise the backrest, and lock the seat for use at a position less rearward than the memorized position (such as, for example, when a passenger has occupied the rearward seat, and the front seat passenger wishes to temporarily re-position and lock the front seat at a more forward position to give the rearward passenger more legroom). To return the seat to its memorized position, the backrest may again be dumped forward, thereby disengaging the track locking system, and, since the memory system 50 has not been reset, sliding the seat rearward until further rearward movement is prevented by the memory module 52 as previously described.

Referring now to FIGS. 8 and 18, the sled 72 may be released from its activated position (and the memory re-set) when the seat release lever 28 is rotated upwardly in order to adjust the longitudinal position of the vehicle seat. As a result, both activation brackets 36, 38 rotate rearwardly with the reset activation lever 94 in its not-activated position, such that the reset activation lever 94 engages the reset lever 96 at its forward end and causes the reset lever 96 to rotate forwardly, thereby causing the rearward end 100 of the reset lever 96 to rotate upward out of the notch 98 in the additional support bracket 70 (as shown in FIG. 15). Since the sled is not constrained by the activation lever 76, sled spring member 86 biases the sled back to its non-activated position, the engagement surface 90 on the sled is moved out of contact with projection 92 on the wheel support bracket 60, and the wheel assembly 60 pivots upward due to its biasing spring, out of engagement with the lower track 24. If the vehicle seat is not in the last selected (i.e., memorized) use position when the memory module 52 returns to the non-activated position, the associated clock spring will cause the track gear wheel 58 to rotate back to its initial position in which the end stop of the track gear wheel 58 is engaged with the end stop of the memory nut 68, thereby resetting the memory module 52 for its next activation. Thus reset, the memory system will re-activate on the next occurrence of dumping the backrest 14 forward.

Figure 19:
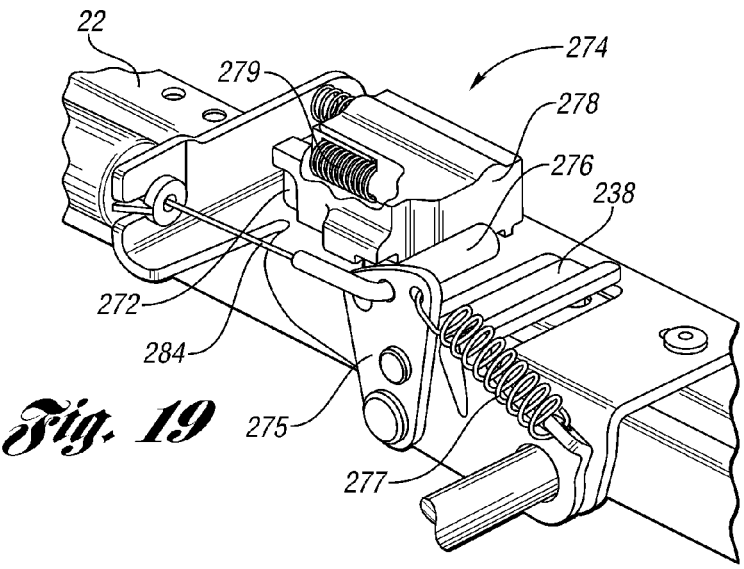
FIG. 19 is a partial forward side perspective view, in partial cross-section, of a portion of a second embodiment of a track assembly (on the memory side) including a memory system incorporating a second embodiment of the compensator with the activation lever in the activated position.
Figure 20:
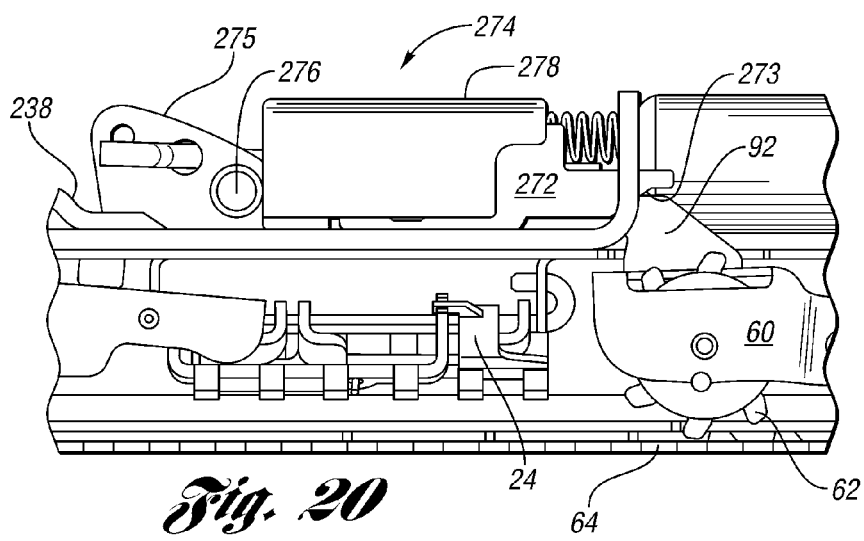
FIG. 20 is a side cross-sectional view of the track assembly of FIG. 19 (on the memory system side) showing the memory module in the intermediate position.

FIGS. 19-25 illustrate a second embodiment of a compensator 274 that may be employed in the disclosed system. Referring in particular to FIGS. 19 and 20, in this second embodiment, the compensator 274 includes an outer or upper sled 278 which, in the disclosed system is mounted atop the sled 272 (also referred to herein as the lower or inner sled). In this embodiment a memory activation bracket 275 is pivotally mounted on track locking system activation bracket 238. A pretensioning spring 277 is disposed between the memory activation bracket 275 and the track locking system activation bracket 238 for biasing the memory activation bracket forwardly (i.e., in the clockwise direction as shown in FIG. 19) to pretension a Bowden cable 284 connected to the activation bracket 275 and the seat back 14. It should be noted, that in this second disclosed embodiment, the Bowden cable is oriented such that when the seat back is dumped forward and the Bowden cable is retracted, the cable rotates the activation bracket 275 rearwardly (i.e., in the counterclockwise direction as shown in FIG. 19). The activation lever 276 is thus also moved in the rearward direction until it contacts and urges the upper sled 278 in the rearward direction. Thus, in the second embodiment, while the track locking assembly 26 and memory module 52 may be identical to the first disclosed embodiment, the compensator 274 and sled 272 motion will move in the opposite direction (i.e., rearward) to activate the memory module.

Still referring to FIGS. 19 and 20, activation lever 276 is mounted on the memory activation bracket 275, and extends across a portion of the top surface of the upper rail 22 such that, as the lever is moved rearward with the rotation of the memory activation bracket 275, the lever 276 contacts the upper sled 278 and urges the upper sled to slide rearward. As illustrated in FIG. 20, the rearward motion of the lever 276, and thereby the upper sled 278, urges sled 272 rearward. A cam surface 273 on the underside of lower sled 272 contacts tab 92 on the wheel support bracket 60 as the sled is moved rearward, thereby urging the memory module 52 downward into its activated position.

Rotation of the memory activation bracket 275 by the retracting Bowden cable also effectuates a rotation of bracket 238, thereby depressing seat lock release button 42, thereby releasing the seat lock track system. Thus, when the seat back 14 is dumped forward, the rearward movement of the activation lever 276 and the upper sled 278 simultaneously urges the sled 272 of the memory system towards its activated position, while causing disengagement of the seat track locking system 24 thereby allowing for slidable movement of the dumped seat.

In the circumstance illustrated in FIG. 20, the sled 272 is prevent from sliding to its fully rearward, activated position because the gear teeth 62 are not aligned with notches 64, thereby preventing the wheel assembly 56 from pivoting fully downward to its activated position in engagement with the lower track. Because the lower sled 272 does not slide fully rearward when urged by upper sled 278 under this circumstance, the upper sled 278 continues to move rearward relative to the lower sled 272, thereby compressing spring 279 and maintaining a rearward force on the lower sled 272.

Figure 21:
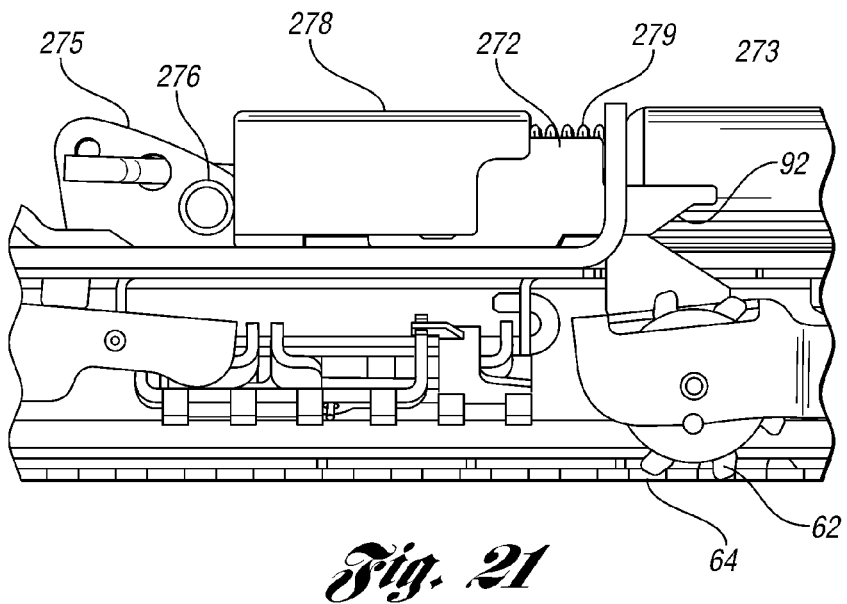
FIG. 21 is a side cross-sectional view of the track assembly of FIG. 19 (on the memory system side) showing the lower sled and memory module in the activated position.

FIG. 21 illustrates the event where the memory system is activated (by rotation of the memory activation bracket 275, rearward movement of lever 276 and rearward movement of upper sled 278) when the seat is positioned such that the gear teeth 62 are aligned with notches 64 in the lower track. In this situation, the rearward motion of the lower sled 272 (caused by the movement of the upper sled and the force of spring 279) forces contact of the cam surface 273 on the sled 272 with tab 92 causing the memory module 52 to pivot downwardly into its active position in engagement with the lower track.

Figure 22:
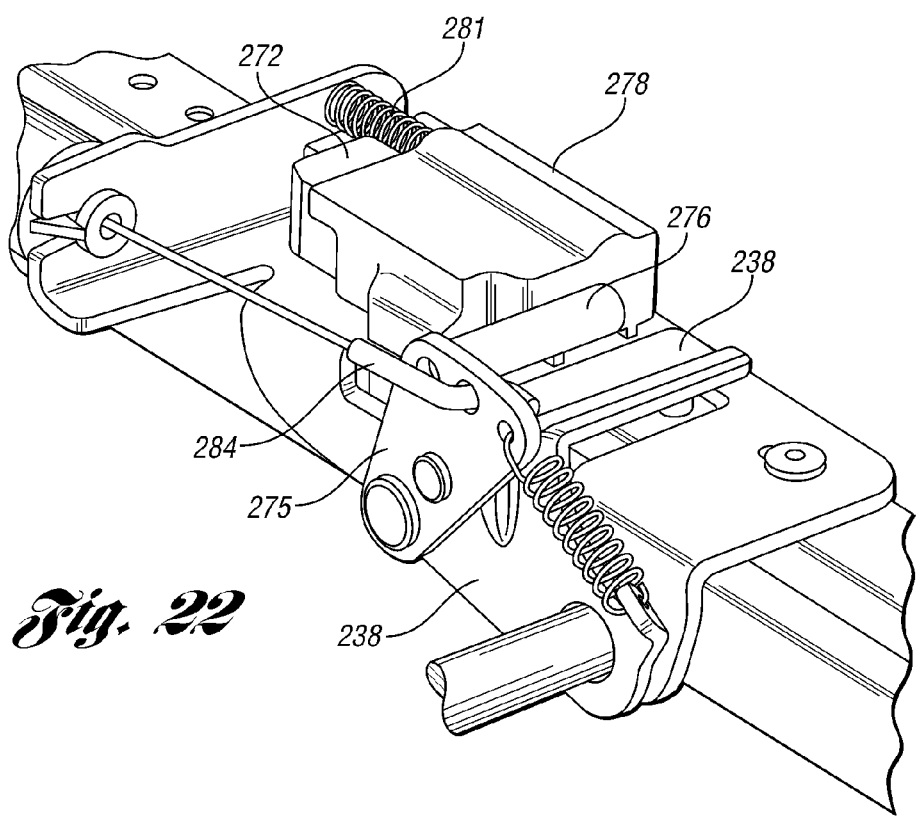
FIG. 22 is a partial forward side elevational view of the track assembly of FIG. 19 (on the memory system side) showing the sled assembly in the inactive position.
Figure 23:
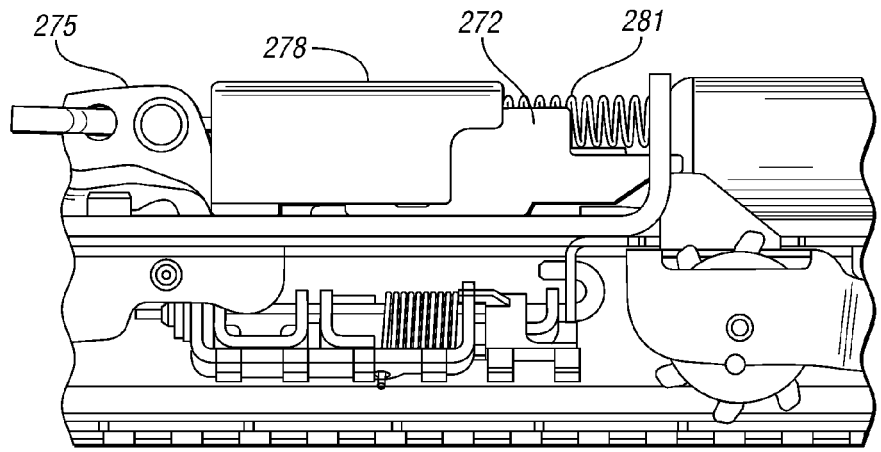
FIG. 23 is a side cross-sectional view of the track assembly of FIG. 19 (on the memory system side, but from the opposite side of the track shown in FIG. 23) showing the sled assembly and memory module each in the inactive position.

FIGS. 22 and 23 illustrate the relative positions of the components of the disclosed system when the backrest is upright (i.e., in the seating position). In this situation the memory module is not activated. The memory activation bracket 275 is biased in its inactive forward position by spring 277, and each of the upper sled 278 and sled 272 are moved to their inactive forward positions, biased by spring 281.

Figure 24:
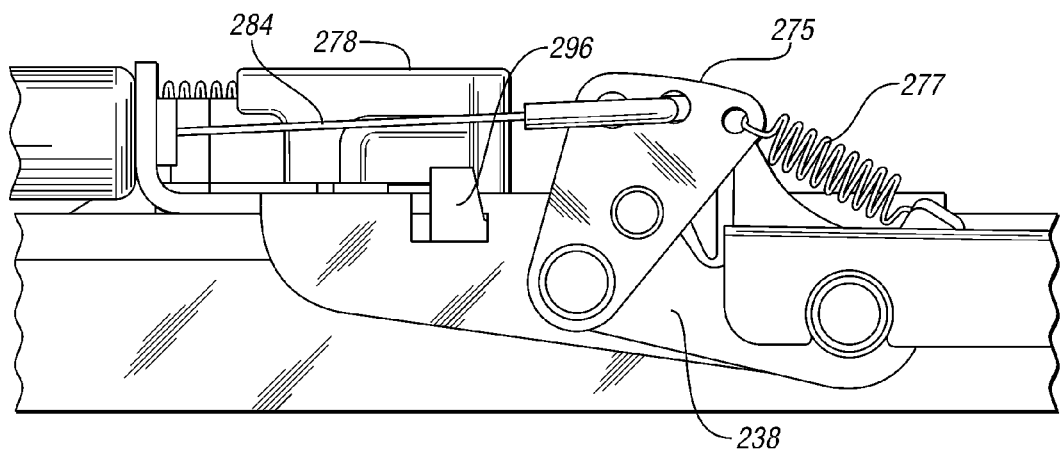
FIG. 24 is a partial side view of the track assembly of FIG. 19 (on the memory system side) showing the upper and lower sleds each in the active position with the reset lever engaged.
Figure 25:
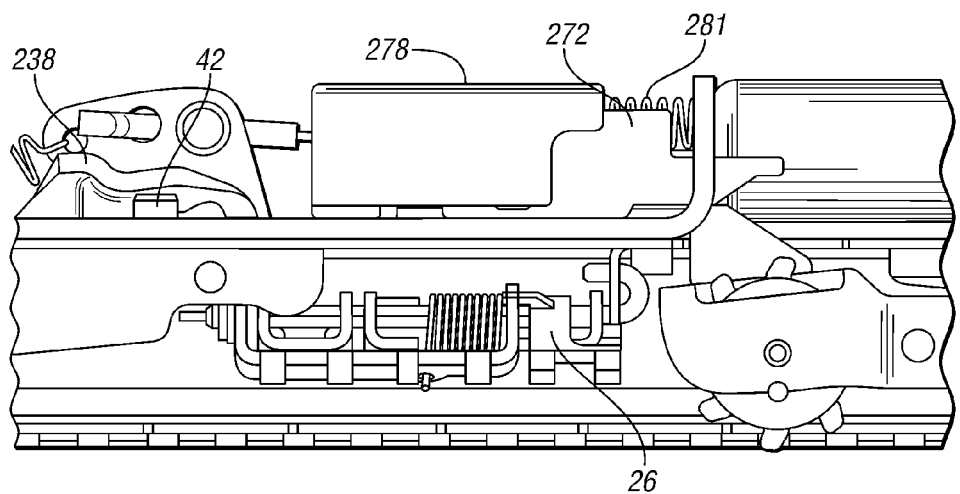
FIG. 25 is a side cross-sectional view of the track assembly of FIG. 19 (on the memory system side, but from the opposite side of the track shown in FIG. 24) showing the upper sled in the inactive position, and the lower sled and memory module each in the active position.

Referring now to FIGS. 24 and 25, in the event the memory module has been first activated (such as, for example, by dumping the seat back forward) and the seatback is thereafter raised to a use position, the Bowden cable 284 will retract and the memory activation bracket will rotate forwardly to its inactive position. At this time, the bracket 238 will also rotate forwardly and upward as a result of the forward position of memory activation bracket 275 thereby allowing the seat track locking assembly 26 to reengage and lock the seat in place at whatever position the seat back is raised to a use position. However, reset lever 296 (shown in FIG. 24) remains in a raised position, interfering with a contact surface on the underside of upper sled 278, thereby retaining upper sled 278, and thereby lower sled 272, in their rearward, activated positions.

Thus, where the seatback has been dumped forward, the seat tracks unlock to allow for slidable forward then rearward movement of the folded seat, followed by raising the backrest to a use position, the seat locks in position for use but the seat memory remains activated. Thus the seatback may be dumped, the seat slidably positioned forward, the seat then slidably positioned rearward to a position short of the memorized position (to, for example, allow for use of the front seat at a relatively forward location when the rear seat is occupied). The seat may then again be slidably positioned rearward until it stops as a result of reaching its initial ("memorized") position. Again, as described above in connection with the first embodiment, the memory system is reset only by pulling up on the external release lever 28. Activation of the external release lever 28 will cause reset lever 296 to move downwardly thereby allowing upper sled 278 and lower sled 272 to each move to their fully forward, inactivated positions (as shown in FIG. 23).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An adjustable memory track assembly for a vehicle seat including:
   at least one lower rail fixedly attached to a vehicle support structure;
   at least one upper rail fixedly attached to the vehicle seat bottom, and slidably mounted in one of the at least one lower seat rails, whereby movement of the at least one upper seat rail with respect to the at least one lower seat rail facilitates longitudinal movement of the vehicle seat;

a track locking system including at least one locking assembly fixedly attached to one of the at least one pair of upper and lower rails, disposed within the other of the pair of rails, and configured to lock the first rail of the pair in a variety of longitudinal positions with respect to the other rail of the pair, wherein the longitudinal positions vary by a first incremental distance, x;

a first actuator operably connected to the seat track locking system and movable between a non-activated position and an activated position whereby the actuator disengages the seat track locking system to allow slidable longitudinal movement of the seat to a first desired location;

a memory system for recording the longitudinal seat displacement under certain pre-defined seat positioning conditions, to the extent that such recorded longitudinal seat displacement is equal to an integer multiple of a second incremental distance, y, which second incremental distance, y, is greater than the first incremental distance, x, the memory system including, a memory module mounted on one of the at least one pair of rails and engageable with the other of the pair of rails upon displacement of the seat at a position within the incremental distance y upon activation, to record the displacement, and a second actuator operable to initiate activation of the memory system, the second actuator including an adjustment increment compensator which, in response to the existence of such pre-defined seat positioning conditions, maintains a controlled force sufficient to activate the memory module as soon as the module is engageable, to thereby allow movement of the seat from the first desired location to another location, and thereafter allow movement of the seat back to within the second incremental distance, y, from the first desired location.

2. The track assembly of claim 1 further including a sled mounted for slidable movement from an inactivated position to an activated position which thereby activates the memory module.

3. The track assembly of claim 2 wherein the adjustment increment compensator includes an activation disc mounted for rotation in response to at least one predefined event, and a spring element connected to the activation disc for displacement upon rotation of the disc, and wherein the rotation of the activation disc results in the application of a controlled force upon the sled which force is applied to either (1) move the sled to its activated position if the memory module is at an engageable position, thereby causing immediate activation of the memory module, or (2) displace the spring element which maintains a constant force on the sled until such time as the seat is displaced such that the memory module is at an engageable position, thereby causing a delayed movement of the sled to its activated position, thereby activating the memory module before the seat has been displaced by a distance up to y.

4. The track assembly of claim 2 wherein the sled is a first sled, and the adjustment increment compensator includes a second sled mounted for slidable movement in response to at least one predefined event, and a spring element connected to the first sled for displacement upon slidable movement of the second sled, and wherein the slidable movement of the second sled results in the application of a controlled force upon the first sled which force is applied to either (1) move the first sled to its activated position if the memory module is at an engageable position, thereby causing immediate activation of the memory module, or (2) displace a spring element which maintains a constant force on the first sled until such time as the seat is displaced such that the memory module is at an engageable position, thereby causing a delayed movement of the first sled to its activated position, thereby activating the memory module before the seat has been displaced by a distance up to y.

5. The track assembly of claim 1 wherein the adjustment increment compensator includes an activation disc mounted for rotation in response to at least one predefined event, and wherein the rotation of the activation disc results in the application of a controlled force which causes either immediate activation of the memory module, or delayed activation of the memory module before the seat has been displaced by a distance up to y.

6. The track assembly of claim 1 wherein the adjustment increment compensator includes an activation sled mounted for linear movement in response to at least one predefined event, and wherein the linear movement of the sled results in the application of a controlled force which causes either immediate activation of the memory module, or delayed activation of the memory module before the seat has been displaced by a distance up to y.

7. A vehicle seat including
a seat bottom,
a backrest mounted for pivotal movement relative to the seat bottom from at least one relatively upright use position to a dumped position where the seat back is pivoted forward over and relatively parallel to the seat bottom, and
an adjustable memory track assembly including,
at least one lower rail fixedly attached to a vehicle support structure;
at least one upper rail fixedly attached to the vehicle seat bottom, and slidably mounted in one of the at least one lower seat rails, whereby movement of the at least one upper seat rail with respect to the at least one lower seat rail facilitates movement of the vehicle seat;
a track locking system including at least one locking assembly fixedly attached to one of the at least one pair of upper and lower rails, disposed within the other of the pair of rails, and configured to lock the first rail of the pair in a variety of longitudinal positions with respect to the other rail of the pair, wherein the longitudinal positions vary by a first incremental distance, x;
a first actuator operably connected to the seat track locking system and movable between a non-activated position and an activated position whereby the actuator disengages the seat track locking system to allow slidable longitudinal movement of the seat to a first desired location;
a memory system for recording the longitudinal seat displacement under certain pre-defined seat positioning conditions, to the extent that such recorded longitudinal seat displacement is equal to an integer multiple of a second incremental distance, y, which second incremental distance, y, is greater than the first incremental distance, x, the memory system including,
a memory module mounted on one of the at least one pair of rails and engageable with the other of the pair of rails upon displacement of the seat at a position within the incremental distance y upon activation, to record the displacement, and
a second actuator operable to initiate activation of the memory system, the second actuator including an adjustment increment compensator which, in response to the existence of such pre-defined seat positioning conditions, maintains a controlled force sufficient to activate the memory module as soon as the module is engageable, to thereby allow movement of the seat from the first desired location to another location, and thereafter allow movement of the seat back to within a fraction of increment y from the first desired location.

8. The vehicle seat of claim 7 further including a sled mounted for slidable movement from an inactivated position to an activated position which thereby activates the memory module.

9. The vehicle seat of claim 8 wherein the adjustment increment compensator includes an activation disc mounted for rotation in response to at least one predefined event, and a spring element connected to the activation disc for displacement upon rotation of the disc, and wherein the rotation of the activation disc results in the application of a controlled force upon the sled which force is applied to either (1) move the sled to its activated position if the memory module is at an engageable position, thereby causing immediate activation of the memory module, or (2) displace the spring element which maintains a constant force on the sled until such time as the seat is displaced such that the memory module is at an engageable position, thereby causing a delayed movement of the sled to its activated position, thereby activating the memory module before the seat has been displaced by a distance up to y.

10. The vehicle seat of claim 8 wherein the sled is a first sled, and the adjustment increment compensator includes a second sled mounted for slidable movement in response to at least one predefined event, and a spring element connected to the first sled for displacement upon slidable movement of the second sled, and wherein the slidable movement of the second sled results in the application of a controlled force upon the first sled which force is applied to either (1) move the first sled to its activated position if the memory module is at an engageable position, thereby causing immediate activation of the memory module, or (2) displace a spring element which maintains a constant force on the first sled until such time as the seat is displaced such that the memory module is at an engageable position, thereby causing a delayed movement of the first sled to its activated position, thereby activating the memory module before the seat has been displaced by a distance up to y.

11. The vehicle seat of claim 7 wherein the adjustment increment compensator includes an activation disc mounted for rotation in response to at least one predefined event, and wherein the rotation of the activation disc results in the application of a controlled force which causes either immediate activation of the memory module, or delayed activation of the memory module before the seat has been displaced by a distance up to y.

12. The vehicle seat of claim 7 wherein the adjustment increment compensator includes an activation sled mounted for linear movement in response to at least one predefined event, and wherein the linear movement of the sled results in the application of a controlled force which causes either immediate activation of the memory module, or delayed activation of the memory module before the seat has been displaced by a distance up to y.

13. The vehicle seat of claim 7 wherein the certain pre-defined seat positioning conditions include longitudinal movement of the seat from its use position to a forward position to allow ingress or egress to a rearward seat within the vehicle.

14. The vehicle seat of claim 7 wherein the certain pre-defined seat positioning conditions include movement of the backrest from a use position to a dumped position, and longitudinal movement of the seat from its use position to a forward position to allow ingress or egress to a rearward seat within the vehicle.

15. The vehicle seat of claim 7 wherein y is an integer multiple of x.

16. The vehicle seat of claim 7 wherein x is 5 millimeters, and y is 10 millimeters.

17. The track assembly of claim 1 wherein the certain pre-defined seat positioning conditions include longitudinal movement of the seat from its use position to a forward position to allow ingress or egress to a rearward seat within the vehicle.

18. The track assembly of claim 1 wherein the certain pre-defined seat positioning conditions include movement of the backrest from a use position to a dumped position, and longitudinal movement of the seat from its use position to a forward position to allow ingress or egress to a rearward seat within the vehicle.

19. The track assembly of claim 1 wherein y is an integer multiple of x.

20. The track assembly of claim 1 wherein x is 5 millimeters, and y is 10 millimeters.

* * * * *